(12) United States Patent
Saito

(10) Patent No.: US 10,832,731 B2
(45) Date of Patent: Nov. 10, 2020

(54) AUDIO SIGNAL PROCESSING APPARATUS AND METHOD FOR PARAMETER ASSIGNMENT

(71) Applicant: Yamaha Corporation, Hamamatsu-shi, Shizuoka-Ken (JP)

(72) Inventor: Kosuke Saito, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 16/039,932

(22) Filed: Jul. 19, 2018

(65) Prior Publication Data

US 2019/0027189 A1    Jan. 24, 2019

(30) Foreign Application Priority Data

Jul. 20, 2017    (JP) ................... 2017-141062

(51) Int. Cl.

| G06F 17/00 | (2019.01) |
|---|---|
| G11B 27/031 | (2006.01) |
| H04S 1/00 | (2006.01) |
| G11B 20/10 | (2006.01) |
| G10H 1/00 | (2006.01) |
| H04R 3/00 | (2006.01) |
| H04H 60/04 | (2008.01) |

(52) U.S. Cl.
CPC ......... *G11B 27/031* (2013.01); *G10H 1/0091* (2013.01); *G11B 20/10* (2013.01); *H04H 60/04* (2013.01); *H04R 3/005* (2013.01); *H04S 1/007* (2013.01); *H04R 2420/01* (2013.01)

(58) Field of Classification Search
CPC .... G11B 27/031; G11B 20/10; G10H 1/0091; H04H 60/04; H04R 3/005; H04R 2420/01
USPC ............................................ 700/94; 381/119
See application file for complete search history.

(56) References Cited

U.S. PATENT DOCUMENTS

2013/0310954 A1    11/2013  Okabayashi

FOREIGN PATENT DOCUMENTS

JP        5929499 B2    6/2016

OTHER PUBLICATIONS

Pro_Tools_12_0_Reference_Guide (Year: 2015).*

(Continued)

*Primary Examiner* — Paul C McCord
(74) *Attorney, Agent, or Firm* — Crowell & Moring LLP

(57) ABSTRACT

An audio signal processing apparatus comprises: a plurality of channels each configured to perform signal processing on an input audio signal; an auxiliary signal processor (e.g., an effecter circuitry) that inputs an audio signal from one or more of the plurality of channels and performs auxiliary signal processing (e.g., effecter impartment processing) on the input audio signal; a plurality of channel strips each associated with one of the plurality of channels and including a plurality of manual controls for adjusting signal processing parameters of the one channel associated with the channel strip; and a controller that, in response to an assignment instruction given by a user, assigns at least one parameter related to the auxiliary signal processor (e.g., the effecter circuitry) to at least one of the plurality of manual controls included in at least one of the plurality of channel strips.

20 Claims, 4 Drawing Sheets

(56) References Cited

OTHER PUBLICATIONS

Pro_Tools_Intro (Year: 2015).*
Pro_Tools_controller (Year: 2008).*
Neve 88d User Manual (Year: 2006).*
SSL AWS900 user manual (Year: 2009).*
Yamaha DME Designer v3.8 (Year: 2010).*

* cited by examiner

AUDIO SIGNAL PROCESSING APPARATUS AND METHOD FOR PARAMETER ASSIGNMENT

BACKGROUND

The present invention relates an audio signal processing apparatus and a method for parameter assignment which are suited for use, for example, in an audio mixer having a plurality of channel strips.

Audio mixers (also referred to simply as "mixers") are constructed basically in such a manner that signal processing, such as control of various characteristics and level adjustment, are performed, in individual ones of a plurality of channels, on audio signals input from sound sources, the thus-processed audio signals are mixed by means of buses, the thus-mixed audio signal are output to an output destination. An operation panel provided on a console of the mixer comprises a plurality of channel strips, and each of the plurality of channel strips is associated with different one of the plurality of channels and includes a plurality of manual controls (namely, manual-operators) for adjusting respective values of signal processing parameters of the one channel associated with the channel strip. Any manual control included in a desired channel strip is operated by a human operator (namely, a user) so as to adjust a value of a signal processing parameter of a desired channel associated with the channel strip.

Further, any effect processing on an audio signal of a desired channel can be performed by an effecter unit which is internally installed in the mixer or externally connected to the mixer. One of conventional usage of the effecter unit is known as a "send/return" mode in which one or more audio signals of one or more channels are mixed via a bus, the thus-mixed audio signal is sent to the effecter unit via an output channel (namely, a send channel) corresponding to the bus and then an effect-imparted audio signal from the effecter unit is returned to another output channel for return-from-effecter (namely, a return channel).

In a case where the effecter unit is employed in the "send/return" mode, for example, parameters related to the effecter unit include various types of parameters such as a sound volume of an audio signal to be send to the effecter unit from the bus (the send channel), namely, a send level, a sound volume of an audio signal to be returned to the return channel from the effecter, namely, a return level, and various parameters for controlling the effect processing in the effecter unit. Conventionally, the send level is adjusted by use of a fader (namely, a fader-type control or manual-operator) provided on a channel strip associated with the send channel, the return level is adjusted by use of a fader provided on a channel strip associated with the return channel, and the various parameters for controlling the effect processing are adjusted by use of an edit screen for the effecter unit that is displayed, in a pop-up display style, on a display.

With the aforementioned arrangement of the conventional mixer, because user interfaces, such as controls (manual-operators), employed for adjusting various parameters related to the effecter unit are dispersedly disposed at various locations, such as the channel strips and the display, on an operation panel, it is insufficient for operability of parameters related to the effecter unit.

For example, U.S. patent application publication No. 2013/310954 corresponding to Japanese patent No. 5929499 discloses a digital mixer in which, when a particular parameter is to be assigned to any one of a plurality of multi-function controls, a plurality of parameters related to the particular parameter are assigned to others of the multi-function controls than the to-be-assigned one too. The conventional art disclosed in the aforementioned U.S. patent document may be applied to the effecter unit so that parameters related to the effecter unit can be assigned to a plurality of multi-function controls. However, because the multi-function controls are of multipurpose devices, an arrangement and/or design thereof would not be considered well in relation to particular audio signal processing, so that there is a possibility that operability of the multi-function controls applied to the effecter unit is inferior to the channel strips, for example.

SUMMARY OF THE INVENTION

In view of the foregoing prior art problems, it is an object of the present invention to provide an audio signal processing apparatus, such as an audio mixer or the like, capable of achieving an improvement of operability in terms of adjustment of parameters related to an auxiliary signal processor which performs auxiliary signal processing on an audio signal separately from signal processing on audio signals in respective channels, and a method for assigning parameters to manual controls in the audio signal processing apparatus.

In order to accomplish the above-mentioned object, the present invention provides an improved audio signal processing apparatus, which comprises: a plurality of channels each configured to perform signal processing on an input audio signal; an auxiliary signal processor that inputs an audio signal from one or more of the plurality of channels and performs auxiliary signal processing on the input audio signal; a plurality of channel strips each associated with one of the plurality of channels and including a plurality of manual controls for adjusting signal processing parameters of the one channel associated with the channel strip; and a controller that, in response to an assignment instruction given by a user, assigns at least one parameter related to the auxiliary signal processor to at least one of the plurality of manual controls included in at least one of the plurality of channel strips.

Because the audio signal processing apparatus according to the present invention is constructed such that the at least one parameter related to the auxiliary signal processor is assigned to the at least one manual controls included in the at least one of the plurality of channel strips, it is possible to adjust the parameter related to the auxiliary signal processor using the manual control (namely, manual-operator) provided on the channel strip. As a result, the present invention can achieve the advantageous benefit that operability in terms of adjustment of parameters related to the auxiliary signal processor is improved.

The present invention may be constructed and implemented not only as the apparatus invention discussed above but also as a computer-implemented method invention. Also, the present invention may be implemented as a non-transitory computer-readable storage medium storing a program executable by one or more processors for performing the method.

The following will describe embodiments of the present invention, but it should be appreciated that the present invention is not limited to the described embodiments and various modifications of the invention are possible without departing from the basic principles of the invention. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION

Now, with reference to the accompanying drawings, a description will be given about an embodiment of the present invention in detail.

Figure 1:
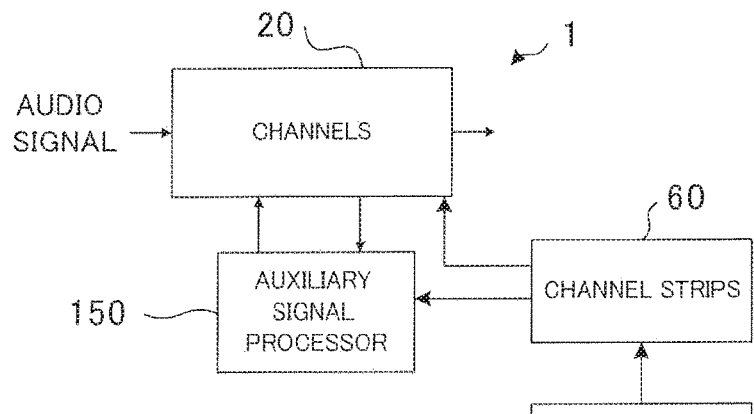
FIG. 1 is a conceptual block diagram of an audio signal processing apparatus according to an embodiment of the present invention.

FIG. 1 is a conceptual block diagram of an audio signal processing apparatus 1 according to an embodiment of the present invention. As shown in FIG. 1, the audio signal processing apparatus 1 comprises: a plurality of channels 20 each configured to perform signal processing on an input audio signal; an auxiliary signal processor 150 that inputs an audio signal from one or more of the plurality of channels 20 and performs predetermined auxiliary signal processing on the input audio signal; a plurality of channel strips 60 each associated with one of the plurality of channels 20 and including a plurality of manual controls (namely, manual-operators) for adjusting signal processing parameters of the one channel associated with the channel strip; and a controller 100 that, in response to an assignment instruction given by a user, assigns at least one parameter related to the auxiliary signal processor 150 (i.e., a parameter to be employed in relation to the auxiliary signal processor 150) to at least one of the plurality of manual controls included in at least one of the plurality of channel strips 60. The controller 100 may be constructed by a CPU 11 executing a computer program stored in a memory 12 as described later. Further, the plurality of channels 20 and the auxiliary signal processor 150 may be realized respectively by a signal processing device 15 as described later.

With the aforementioned arrangements, because the controller 100 assigns the at least one parameter related to the auxiliary signal processor 150 to the at least one of the plurality of manual controls in the at least one channel strip 60 in response to the assignment instruction given by a user, an operation environment where the user can adjust a value of the parameter related to the auxiliary signal processor 150 using the assigned manual control in the channel strip 60 is provided. The auxiliary signal processor 150 is an auxiliary (in other words, additional or supplementary) processor that performs predetermined signal processing (namely, auxiliary signal processing) different from main signal processing on audio signals in the respective channels 20 which is a main function of the audio signal processing device 1. In an embodiment described hereinbelow, the auxiliary signal processor 150 is an effecter circuitry which performs effect impartment processing on an input audio signal (namely, audio effect impartment processing).

The audio signal processing apparatus 1 shown in FIG. 1 is applicable to audio equipment, such as an audio mixer, which handles audio signals. The embodiment of the audio signal processing apparatus 1 will be described in greater detail hereinbelow as applied to an audio mixer. It is assumed here that the audio mixer 10 is a digital mixer (hereinafter referred to simply as "mixer") which processes audio signals mainly by digital signal processing.

Figure 2:
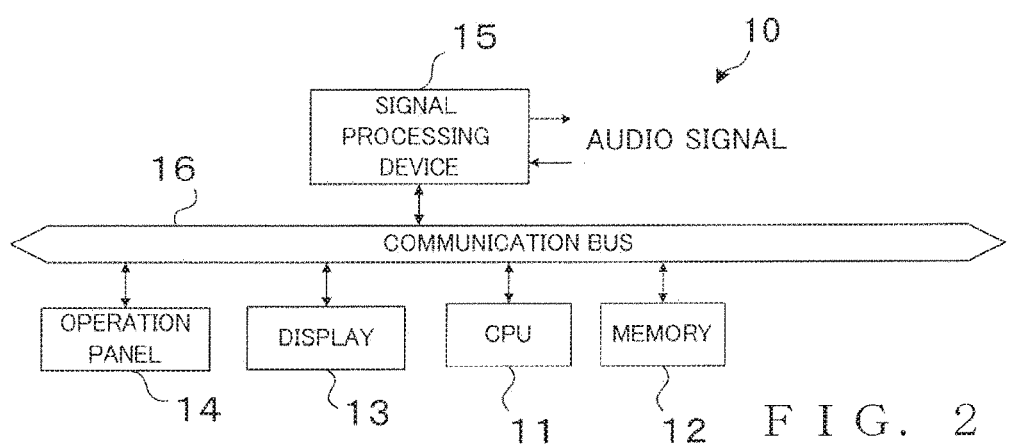
FIG. 2 is a block diagram showing an example hardware setup of a digital mixer having the audio signal processing apparatus applied thereto.

FIG. 2 is a block diagram showing an example hardware setup of the mixer 10. As shown in FIG. 2, the mixer 10 includes the CPU (Central Processing Unit) 11, the memory 12, a display 13, an operator unit 14 and the signal processing device 15, and these components 11 to 15 are interconnected via a communication bus 16.

The CPU 11 executes various programs stored in the memory 12 and controls the mixer 10. The memory 12 stores various programs to be executed by the CPU 11 and various data, etc. in a nonvolatile manner. Also, the memory 12 is employed as a loading area and a working area of the program to be executed by the CPU 11. The memory 12 may be constituted by appropriately combining various memory devices such as a ROM (Read-Only Memory), a RAM (Random Access Memory), a flash memory, a hard disk, etc. Further, the memory 12 stores therein values of all parameters used for controlling signal processing performed by the signal processing device 15.

The display 13 may be constituted, for example, by a liquid crystal display panel, an organic electroluminescent display device or the like, and can display various visual screens including an overview screen for presenting an overview of information of a plurality of channels, an effecter edit screen for setting various functions of the effecter circuitry, etc., on the basis of instructions from the CPU 11. The display 13 may be a display device of a touch panel type having an entry function that allows an entry of instructions, characters, etc. via a contact operation (namely, touch operation) by a user onto a screen of the display device. Alternatively, the display 13 may not have the entry function via the touch operation. The operator unit 14 includes a plurality of manual controls (namely, manual-operators) provided on an operation panel of the mixer 10, an interface circuitry related to the plurality of manual controls, etc. Note that the channel strips 60 shown in FIG. 1 are provided on the operator unit 14.

The signal processing device 15 may be constituted by a DSP (Digital Signal Processor) or a virtual signal processing device realized by the CPU 11 configured to execute a software program for a DSP function stored in the memory 12, for example. The signal processing device 15 executes a program for signal processing to perform signal processing, according to parameter values for the signal processing, on an audio signal supplied via an input device (not-shown) and output the processed audio signal to an output device (not-shown). The signal processing in the signal processing device 15 is controlled based on various parameter values stored in the memory 12.

Figure 3:
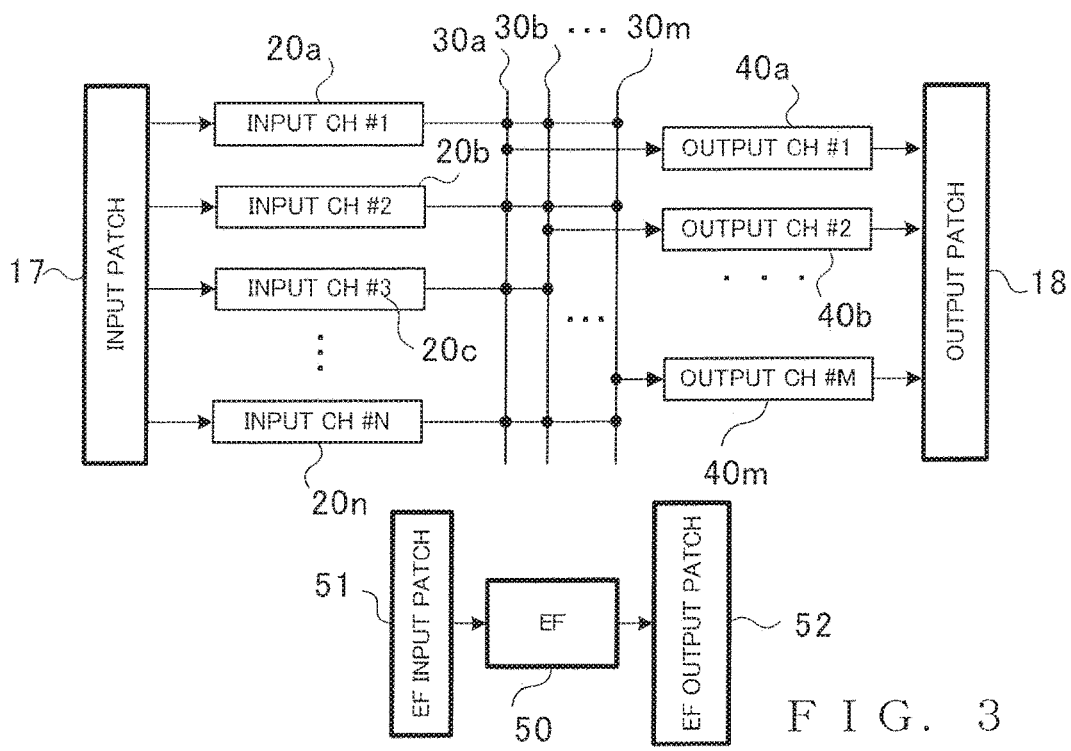
FIG. 3 is a block diagram illustrating a configuration of signal processing performed by the mixer shown in FIG. 2.

FIG. 3 is a block diagram illustrating a configuration of signal processing performed by the signal processing device 15. An input patch section 17 patches (connects) any one of a plurality of input jacks (not shown) to each of the first to Nth input channels 20a, 20b, ..., 20n, and supplies an audio signal received from the patched input jack to the input channel 20. Note that, in the present specification, when individually distinguishing a plurality of components from one another, such as when referring to the input channels 20a, 20b, ..., 20n, for example, a reference numeral accompanied by an alphabet will be used. However, if the components do not need to be individually distinguished from one another, a reference numeral having the accompanied alphabet omitted therefrom, such as "input channels 20" or "input channel 20", for example, will be used as a reference numeral. Also, it should be noted that the term "channel" is abbreviated as "CH" in the accompanying drawings.

Figure 4:
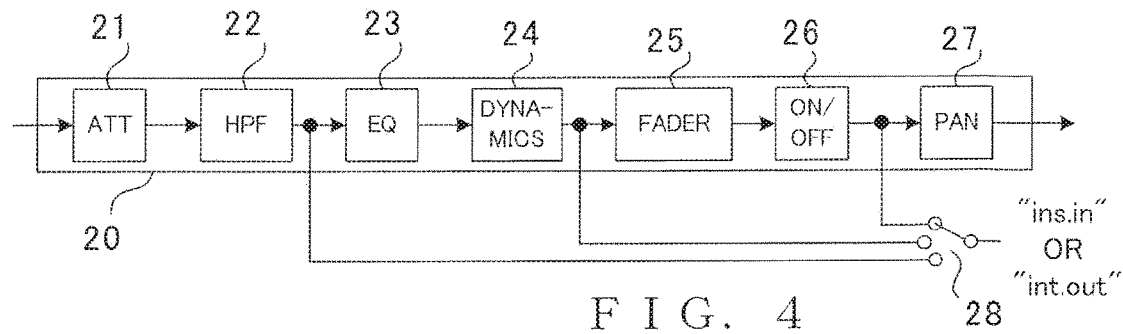
FIG. 4 is a block diagram illustrating a detailed construction of an input channel.

As shown in FIG. 4, in each of the input channels 20, signal processing by an attenuator (ATT) 21, a high-pass filter (HPF) 22, an equalizer (EQ) 23, a dynamics adjuster 24, a fader 25, an ON/OFF switch 26 and a panning adjuster (PAN) 27 are sequentially performed on an input audio signal. As shown in FIG. 3, the thus-processed audio signal is supplied to the first to Mth buses 30a, 30b, ..., 30m from each of the input channels 20.

Figure 5:
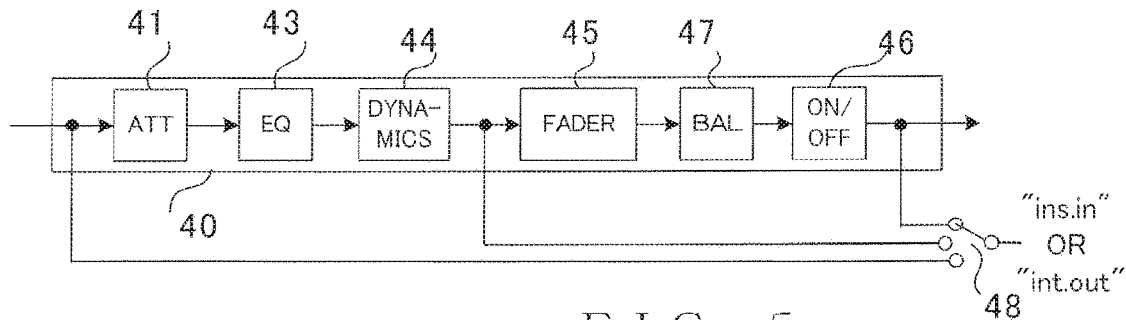
FIG. 5 is a block diagram illustrating a detailed construction of an output channel.

Each of the buses 30a, 30b, ..., 30m (sometimes depicted simply by reference numeral 30) mixes the audio signals supplied from one or more input channels 20 and supplies the resultant mixed audio signal to a corresponding one of the output channels 40a, 40b, ..., 40m. As shown in FIG. 5, in each of the output channels 40a, 40b, ..., 40m (sometimes depicted simply by reference numeral 40), signal processing by an attenuator (ATT) 41, an equalizer (EQ) 43, a dynamics adjuster 44, a fader 45, a balance volume (BAL) 47 and an ON/OFF switch 46 are sequentially performed on the mixed audio signal supplied from the corresponding bus 30, and the mixed audio signal having been subjected to such signal processing is supplied to an output patch section 18.

As shown in FIG. 3, the output patch section 18 patches each of the first to Mth output channels 40a, 40b, ..., 40m to any one of output jacks (not shown), and it supplies the audio signal processed by each of the output channels 40 to the output jack having the output channel patched thereto. The respective output jacks are connected to output equipments, such as a speaker for a main output, headphones for a monitor, a recorder, etc.

The mixer 10 comprises an internal effecter 50 capable of selectively realizing various types of audio effecters, such as an equalizer, compressor, reverberation, delay, etc., for example. The internal effecter 50 is an audio effecter circuitry comprising a DSP constructed to perform a predetermined microprogram for an audio effecter (i.e., an audio effect impartment circuitry) and/or a dedicated electric/electronic circuitry for an audio effecter (i.e., an audio effect impartment circuitry). As well known in the art, the mixer 10 allows a user to select one or more of a plurality of effecter functions capable of being realized by the internal effecter 50, so that an audio effect corresponding to the selected effecter function is imparted to an audio signal by the internal effecter 50. Noted that the term "effecter" is abbreviated as "EF" in the accompanying drawings. The internal effecter 50 (labeled "EF" in FIG. 3) configured to realize the selected effecter function inputs, via an effecter input patch section 51 (labeled "EF INPUT PATCH" in FIG. 3), an audio signal from at least one of the input channels 20a-20n or at least one of the output channels 40a-40m and performs an effect impartment process, corresponding to the selected effecter function, on the input audio signal. The effect-imparted audio signal is supplied from the internal effecter 50 to an output destination patched via an effecter output patch section 52 (labeled "EF OUTPUT PATCH" in FIG. 3). The internal effecter 50 is one of specific examples of the auxiliary signal processor 150.

As shown in FIGS. 4 and 5, in connection with the effecter input patch section 51 and the effecter output patch section 52, each input channel 20 or output channel 40 has a switching section 28, 48 for selecting, as an insertion position, a desired position on an audio signal route within the channel. In accordance with the patching via the respective patch sections 51, 52, the respective switching section 28, 48 is connected to the effecter input patch section 51 or the effecter output patch section 52, and the respective insertion position is selected via the respective switching section 28, 48. When the switching section 28, 48 is connected to the effecter input patch section 51, a connection mode in the switching section 28, 48 becomes an Insert-Out mode (labeled "ins.out" in FIGS. 4 and 5). On the other hand, when the switching section 28, 48 is connected to the effecter output patch section 52, a connection mode in the switching section 28, 48 becomes an Insert-In mode (labeled "ins.in" in FIGS. 4 and 5).

The effecter input patch section 51 patches, to the internal effecter 50, one input source designated from among the insertion positions of the respective input channels 20 and output channels 40 selected via the respective switching sections 28, 48 in the Insert-Out mode ("ins.out"), the outputs of the respective output channels 40, etc., and supplies an audio signal from the patched input source to the internal effecter 50. The effecter output patch section 52 patches an output of the internal effecter 50 to one output destination designated from among the insertion positions of the respective input channels 20 and output channels 40 selected via the respective switching sections 28, 48 in the Insert-In mode ("ins.in"), etc., and supplies the effect-imparted audio signal from the internal effecter 50 to the patched output destination.

Figure 6:
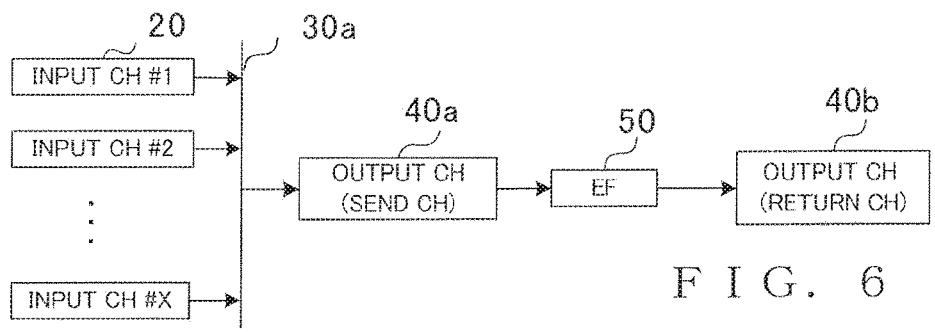
FIG. 6 is a block diagram illustrating an example of connection between functional blocks when an effecter circuitry is employed in a "Send & Return" mode.

There is usage of the internal effecter 50 that is known as a "Send & Return" mode in which an audio signal or signals output from one or more input channels 20 or one output channel 40 is send to the internal effecter 50 and the resultant effect-imparted audio signal is returned to an output channel 40 from the internal effecter 50. In the "Send & Return" mode, the internal effecter 50 is incorporated in the mixer 10 functionally as shown in FIG. 6, for example. Namely, an audio signal or signals output from one or more input channels 20 (i.e., input channels #1, #2, ..., # X in the case of FIG. 6) of the plurality of input channels 20a, 20b, ..., 20n are supplied to one bus 30a. The effecter input patch section 51 patches an output of the bus 30a to an input of the internal effecter 50 so as to supply the resultant audio signal mixed by the bus 30a to the internal effecter 50 via the output channel 40a. The effecter output patch section 52 patches the output of the internal effecter 50 to an insertion position of an output channel 40b via the switching section 48 in the Insert-In mode ("ins.in") so as to supply the resultant audio signal from the internal effecter 50 to the insertion position of the output channel 40b. In this case, the output channel 40a functions as a "Send Channel" for sending an audio signal to the effecter 50 so that a sound volume of the mixed audio signal to be input the effecter 50 (namely, send level) is controlled by the fader 45 of the "Send Channel" (e.g., output channel 40a in FIG. 6). Further, in this case, the output channel 40b functions as a "Return Channel" for receiving an audio signal from the effecter 50 so that a sound volume of the effect-imparted audio signal output from the effecter 50 (namely, return level) is controlled by the fader 45 of the "Return Channel" (e.g., output channel 40b in FIG. 6).

In order to use the internal effecter 50 with a desired effecter function in the "Send & Return" mode, first, a user (namely, a human operator of the mixer 10) selects a desired effecter function, as an effecter function to be realized by the internal effecter 50, from among the plurality of effecter functions that are displayed on an effecter selection screen on the display 13, for example. Thereafter, the user performs an operation of setting for patching one of the output channels 40 (namely, "Send Channel") to the input of the internal effecter 50 with the selected effecter function, i.e., setting of the effecter input patch section 51, and an operation of setting for patching the output of the internal effecter 50 to one of the output channels 40 (namely, "Return Channel"), i.e., setting of the effecter output patch section 52. It should be noted that, as mentioned below in detail, the mixer 10 according to the present embodiment is characterized in that a function of adjusting parameters related to the effecter 50 (namely, auxiliary signal processor 150), such as the send level and/or return level, is assigned to at least one of the plurality of channel strips 60 provided on an operation panel.

Figure 7:
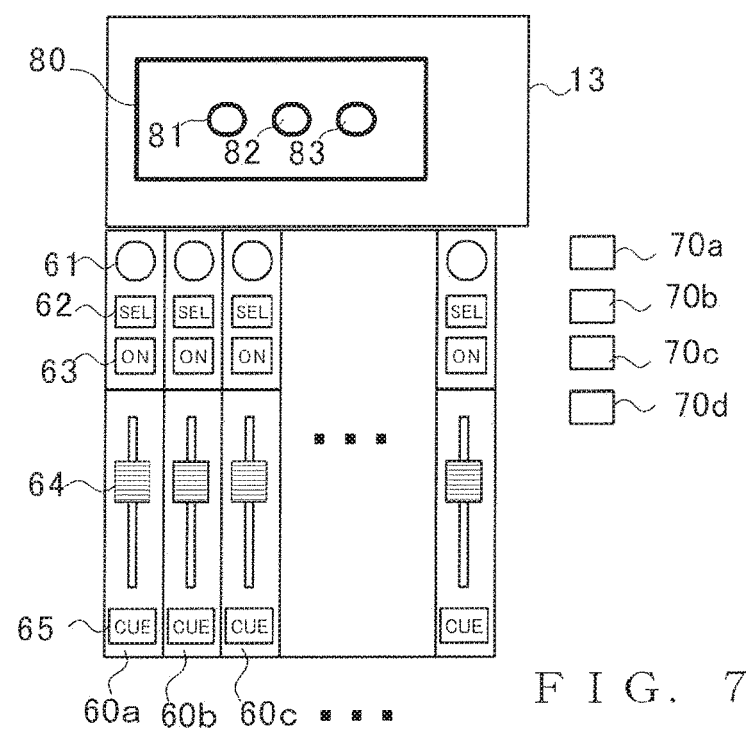
FIG. 7 is a diagram illustrating a configuration example of an operation panel in the mixer.

FIG. 7 shows a configuration example of the operation panel provided on a console of the mixer 10. The operation panel comprises the display 13 and the plurality of channel strips 60a, 60b, 60c, . . . . The plurality of channel strips 60a, 60b, 60c, . . . are arranged parallel with each other in a lateral direction immediately below the display 13. Note that a vertical direction in FIG. 7 denotes a front-back direction which extends from a front side (namely, user's location) of the operation panel to a back side thereof; and that the lateral direction in FIG. 7 denotes a right-left direction which extends from one of right and left sides of the user's location to another side thereof.

The display 13 is configured to selectively display various screens, such as an overview screen for presenting an overview of information about channels allotted to respective ones of the plurality of channel strips 60a, 60b, 60c, . . . , a selected channel screen for presenting details of information about one channel (namely, a selected channel) selected from among the channels allotted to respective ones of the plurality of channel strips 60a, 60b, 60c, . . . , an effecter edit screen to be used for adjusting parameters related to the effecter 50, and a patch setting screen to be used for setting a patch, for example.

Each of the plurality of channel strips 60a, 60b, 60c, . . . includes a plurality of manual controls (namely, manual-operators), such as an encoder 61 (namely, an encoder for encoding a manually-operated position, or a rotary manual-operator), a selection key 62 (labeled "SEL" in FIG. 7), an ON/OFF key 63 ((labeled "ON" in FIG. 7), a fader manual-operator 64 and a cue key 65 ((labeled "CUE" in FIG. 7). These manual controls 61-65 included in a single channel strip 60 (namely, one of 60a, 60b, 60c, . . . ) are aligned in the vertical direction (or a longitude direction) as shown in FIG. 7. According to conventional usage of the channel strip 60, a predetermined function of adjusting signal processing parameters related to one input channel 20, one output channel 40, or one channel group having grouped two or more of the plurality of input channels 20 or two or more of the plurality of output channels 40 (for convenience sake, hereinbelow, the respective ones of the input channel 20, output channel 40 and channel group may be sometimes comprehensively referred to as the "channel") is assigned to the respective ones of the plurality of channel strips 60a, 60b, 60c, . . . . In such a case, predetermined signal processing parameters related to the channel are assigned to the respective manual controls 61-65 of the channel strip 60. Namely, the single channel strip 60 essentially comprises the plurality of manual controls 61-65 that are collectively aligned in the vertical direction. In this way, because the plurality of manual controls 61-65 belonging to the single channel strip 60 are aligned in the vertical direction, the single channel strip 60 is designed such that a user can easily perform an operation of the channel strip for adjusting the signal processing parameters related to a single channel in an intuitive and efficient manner.

On the other hand, special usage of the channel strip 60 according to the present invention is characterized such that at least one parameters related to the effecter 50 is assigned to at least one of the plurality of manual controls 61-65 of at least one channel strip 60 of the plurality of channel strips 60a, 60b, 60c, . . . . In one embodiment, a function of adjusting parameters related to the effecter 50 is assigned to any one channel strip 60, and a plurality of parameters related to the effecter 50 are assigned to the respective ones of the plurality of manual controls 61-65 included in the one channel strip 60 to which the function is assigned. In such a case, the user can adjusts the respective parameters related to the effecter 50 using the respective manual controls 61-65 belonging to the one channel strip 60. In other words, said one channel strip 60 functions as a channel strip including the plurality of manual controls 61-65, aligned in the vertical direction, for adjusting the plurality of parameters related to the effecter 50, i.e., a channel strip for a "virtual effecter channel". The plurality of parameters related to the effecter 50 are various parameters for controlling various operations and/or signal processing related to the effecter 50 which include a parameter for controlling a sound volume of an audio signal input to the effecter 50 (namely, a send level), a parameter for controlling a sound volume of an audio signal output from the effecter 50 (namely, a return level), an effecter ON/OFF switching parameter for switching between ON and OFF of the effecter 50, a display/non-display switching parameter for switching between display and non-display of the edit screen of the effecter 50, a monitor output ON/OFF switching parameter for switching between ON and OFF of output from the effecter 50 to a monitor. etc.

Bank selection keys 70a, 70b, 70c and 70d are provided in corresponding relation to a plurality of groups of channels and used for collectively selecting a plurality of channels to be associated with the respective channel strips 60a, 60b, 60c, . . . . For example, the bank selection keys 70a, 70b and 70c are fixedly allotted to respective ones of different groups of channels, such as a group of the first to eighth channels 20, a group of the ninth to sixteenth channels 20, and the like, while the bank selection key 70d is allotted to a special group (i.e., a custom fader bank) to which a plurality of desired channels freely selected and combined by the user belong. In an embodiment, it is assumed that, in the custom fader bank, at least one of the channel strips 60a, 60b, 60c, . . . is associated with the effecter 50, as the "virtual effecter channel", in accordance with setting by the user.

The setting of the custom fader bank is performed using a custom fader bank setting screen displayed on the display 13, for example. A sequence of the setting of the custom fader bank is as generally mentioned below. First, in response to a user's instruction of the setting of the custom fader bank, the CPU 11 displays the custom fader bank setting screen on the display 13. Then, the user designates a desired one of the channel strips 60a, 60b, 60c, . . . one by one, so that the CPU 11 presents several choices of a subject for the designated one channel strip on the custom fader bank setting screen. The several choices of the subject include the "channel" (namely, the plurality of input channels 20a, 20b, 20c, . . . , the plurality of output channels 40a, 40b, 40c, . . . , and the channel group set by the user) and the effecter 50. For example, the choices of the subject regarding the effecter 50 may include only an effecter function or functions currently employed for the signal processing in the effecter 50 rather than all of the internal effecter functions provided in the mixer 10. The user can select a desired "channel" or effecter function from among the presented choices of the subject in corresponding relation to the designated one channel strip. In this way, it is possible that the user carries out desired setting of the custom fader bank by freely associating (selecting) a desired "channel" or effecter function with an individual one of the channel strips 60a, 60b, 60c, . . . .

After having set the custom fader bank according to the aforementioned sequence of the setting so that the effecter 50 is associated with at least one of the channel strips 60a, 60b, 60c, . . . , the user can easily assign the respective parameters related to the effecter 50 to the respective manual controls 61-65 of the at least one of the channel strips 60a, 60b, 60c, . . . by depressing the bank selection key 70d allotted to the custom fader bank. In this embodiment, to depress the bank selection key 70d functions as the assignment instruction (namely, a first instruction) given by the user. Note that to give the assignment instruction (the first instruction) is not limited to the depression of the bank selection key 70d, but it may be performed by another user's action or operation, such as a depression of any predetermined key on the operation panel, a depression of a button image (or icon) displayed on the touch panel type display 13, or the like, for example. Further, to give the assignment instruction (the first instruction) is not limited to the depression of the key or button, but it may be performed by an instruction in any inputting way, such as a slide operation on a touch panel of the display 13, an instruction via a voice, or the like, for example.

Figure 8:
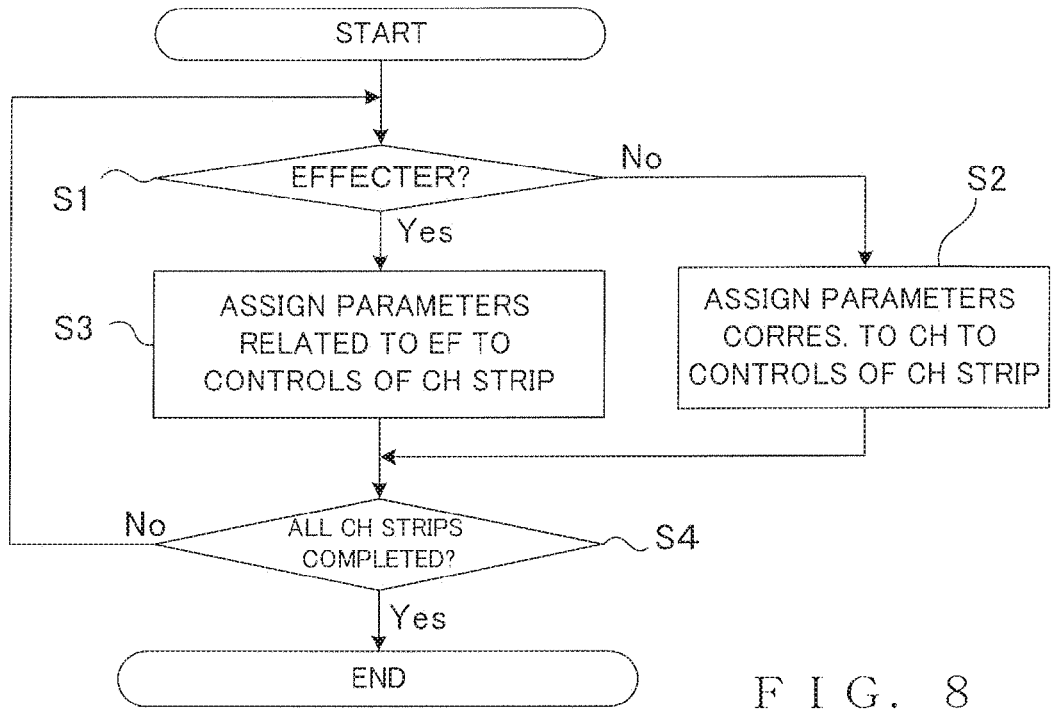
FIG. 8 is a flow chart showing a parameter assignment process.

FIG. 8 is a flow chart showing an example of a parameter assignment process that starts in response to the user's operation of the bank selection key 70d (namely, the assignment instruction). In the parameter assignment process shown in FIG. 8, the CPU 11 executes the following processing, for each of the channel strips 60a, 60b, 60c, . . . , on the basis of content of the custom fader bank. At step S1, the CPU 11 determines, on the basis of the content of the custom fader bank, whether a target channel strip 60 is associated with the effecter 50 or not. Note that the target channel strip 60 is one of the channel strips 60a, 60b, 60c, . . . to which the processing of steps S1 to S3 is currently subjected, and that the target channel strip 60 is sequentially changed to another one each time when NO determination is made at step S4. If the target channel strip is associated with the "channel" (NO determination at step S1), the CPU 11 assigns the signal processing parameters of the corresponding channel to the respective manual controls 61-65 of the target channel strip 60 at step S2. On the other hand, if the target channel strip is associated with the effecter 50 (YES determination at step S1), at step S3, the CPU 11 assigns the parameters related to the effecter 50 to the respective manual controls 61-65 of the target channel strip 60. The CPU 11 repeats the processing of steps S1-S3 with the target channel strip sequentially changed to another one unless the assignment to all channel strips 60 set in the custom fader bank is completed (NO determination at step S4). Once the assignment to all channel strips 60 set in the custom fader bank is completed (YES determination at step S4), the processing of FIG. 8 is brought to an end. Note that the process performed at step S3 by the CPU 11 corresponds to the functional operation performed by the controller 100 of FIG. 1. In other words, the process performed at step S3 by the CPU 11 corresponds to an assignment step of assigning, in response to the assignment instruction given by the user, at least one parameter related to the effecter 50 (namely, the auxiliary signal processor 150) to at least one of the plurality of manual controls 61-65 included in at least one of the plurality of channel strips 60.

In a specific example, assuming that the target channel strip 60 is associated with an input channel 20 (NO determination at step S1), at step S2, the assignment to the respective manual controls 61-65 of the target channel strip 60 are set as described below, for example. In such a case, the encoder 61 functions as a manual control for adjusting a value of an input gain (ATT 21) or panning (PAN 27) in the corresponding input channel 20 or a multi-function operator to which desired one of plural functions can be allotted; the selection key 62 functions as a key for selecting the corresponding input channel as a selected-channel; the ON/OFF key 63 functions as a key (namely, the ON/OFF switch 26) for switching the audio signal from the corresponding input channel 20 to the bus between ON and OFF states; the fader manual-operator 64 functions as a manual control for adjusting a value of the fader 25 of the corresponding input channel 20; and the cue key 65 functions as a key for switching a monitor output (cue) from the corresponding input channel 20 between ON and OFF states.

On the other hand, assuming that the target channel strip 60 is associated with the effecter 50 (YES determination at step S1), at step S3, the CPU 11 assigns the respective parameters related to the effecter 50 to the respective manual controls 61-65 of the target channel strip 60 as described hereinbelow, for example. Note that it is assumed that the effecter 50 is used or operated in the "Send & Return" mode. In the "Send & Return" mode, the respective parameters related to the effecter 50 are assigned to the respective manual controls 61-65 in such a manner that: the encoder 61 functions as a manual control for adjusting a value of the send level to the effecter 50, e.g., a value of the fader 45 of the "Send Channel" 40 (e.g., output channel 40a in FIG. 6); the selection key 62 functions as a key for switching the effecter edit screen for the effecter 50 between display ON and OFF states; the ON/OFF key 63 functions as a key for switching the effecter 50 between ON and OFF states; the fader manual-operator 64 functions as a manual control for adjusting a value of the return level from the effecter 50, e.g., a value of the fader 45 of the "Return Channel" 40 (e.g., output channel 40b in FIG. 6); and the cue key 65 functions as a key for switching a monitor output (cue) from the effecter 50 between ON and OFF states.

In summary, the aforementioned specific process performed at step S3 by the CPU 11 can be defined such that the CPU 11 (namely, the controller 100) is configured to, in response to the assignment instruction given by the user, assign, to at least one (e.g., encoder 61) of the plurality of manual controls 61-65 included in the at least one channel strip 60, a parameter for controlling a sound volume (e.g., the send level) of an audio signal input to the effecter 50 (namely, the auxiliary signal processor 150) and assign, to at least another one (e.g., fader manual-operator 64) of the plurality of manual controls 61-65 included in the at least one channel strip 60, a parameter for controlling a sound volume (e.g., the return level) of an audio signal output from the effecter 50 (namely, the auxiliary signal processor 150).

Conventionally, because various parameters related to the effecter 50 are dispersedly employed in various signal processing components or channels, such as the "Send Channel" 40 (e.g., output channel 40*a*) and the "Return Channel" 40 (e.g., output channel 40*b*), it is necessary to adjust the respective parameters related to the effecter 50 using necessary manual controls 61-65 which are dispersedly provided on the various signal processing components or channels. In contrast, according to the present embodiment, because the various parameters related to the effecter 50, such as the send level (namely, the level of the fader 45 of the "Send Channel" 40), the return level (namely, the level of the fader 45 of the "Return Channel" 40), etc., which are to be employed in different channels depending on an audio signal route related to the effecter 50 are efficiently assigned to a set of the manual controls 61-65, such as the encoder 61, the fader manual-operator 64, etc. belonging to (or included in) the same single channel strip 60 via the process performed at step S3, the same single channel strip 60 becomes efficiently usable as a channel strip dedicated to the "virtual effecter channel". Thus, the user can operate (or adjust) the respective parameters related to the effecter 50, as parameters in one "virtual effecter channel", using the same single channel strip 60 for the "virtual effecter channel" with a similar feeling to adjustment of parameters in a single signal processing channel as if the user adjusts the parameters in the same signal processing channel.

Figure 9:
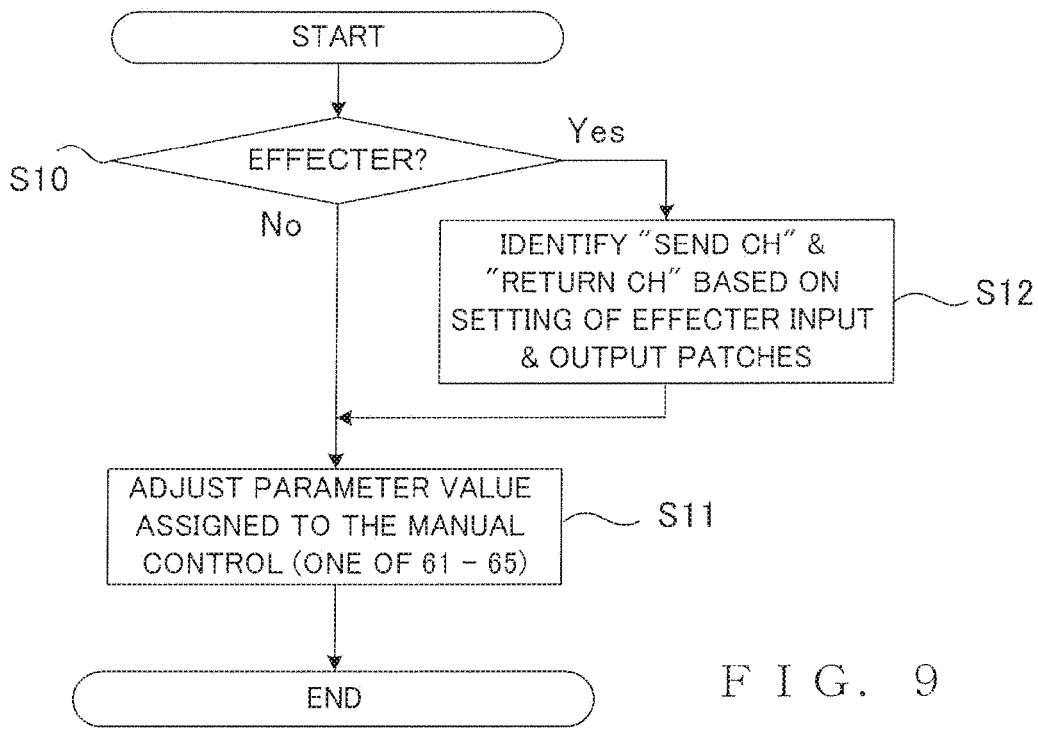
FIG. 9 is a flow chart of a process responsive to an operation of a manual control in a channel strip.

It is possible for the user to operate the manual controls 61-65 of the respective channel strips 60*a*, 60*b*, 60*c*, . . . so as to adjust values of parameters assigned to the respective manual controls 61-65. FIG. 9 is a flow chart of a process performed by the CPU 11 in response to an operation of any one of the manual controls 61-65 provided on a channel strip 60. At step S10, the CPU 11 determines whether or not the effecter 50 is associated with the channel strip 60 to which the operated manual control belongs.

If the "channel" (e.g., the input channel 20) is associated with the channel strip 60 to which the operated manual control belongs (No determination at step S10), at step S11, the CPU 11 performs a process for adjusting a value of the signal processing parameter assigned to the operated manual control (any of 61-65) of the channel strip 60 according to the operation of the manual control. The process performed at step S11 to adjust the value of the signal processing parameter includes changing (renewing) the value of the signal processing parameter stored in the memory 12 and reflecting the changed (renewed) value of the signal processing parameter in an actual signal processing performed in the signal processing device 15.

On the other hand, the effecter 50 is associated with the channel strip 60 to which the operated manual control belongs (YES determination at step S10), at step S12, the CPU 11 identifies the "Send Channel" 40 (e.g., output channel 40*a* shown in FIG. 6) and the "Return Channel" 40 (e.g., output channel 40*b* shown in FIG. 6) on the basis of the setting of the effecter input patch section 51 and the effecter output patch section 52. In one of examples, the CPU 11 may execute the process at step S12 only in a case where it is necessary to identify the "Send Channel" or "Return Channel" such as a case where the operated manual control is one of the encoder 61, fader manual-operator 64, ON/OFF key 63 or the like. Alternatively, the CPU 11 may execute the process at step S12 such that only a necessary "Send Channel" or "Return Channel" can be identified on the basis of the type of the operated manual control. After the process of step S12, the CPU 11 executes the process at said step S11, so that the value of the signal processing parameter assigned to the operated manual control is adjusted as described hereinbelow in detail.

In a case of the encoder 61 being operated, for example, the CPU 11 adjusts, in response to an amount of the operation of the encoder 61, the value of the fader 45 of the "Send Channel" 40 (e.g., output channel 40*a* shown in FIG. 6) identified by the process performed at step S12, so that the send level to the effecter 50 is adjusted.

In a case of the fader manual-operator 64 being operated, for example, the CPU 11 adjusts, in response to an amount of the operation of the fader manual-operator 64, the value of the fader 45 of the "Return Channel" 40 (e.g., output channel 40*b* shown in FIG. 6) identified by the process performed at step S12, so that the return level from the effecter 50 is adjusted.

In a case of the selection key 62 being operated, the CPU 11 switches the effecter edit screen 80 for the effecter 50 between display ON and OFF states. For example, when an instruction to switch the effecter edit screen 80 to the display ON state is given by the operation of the selection key 62, the CPU 11 displays the effecter edit screen 80 in a pop-up style on the display 13, whereas when an instruction to switch the effecter edit screen 80 to the display OFF state is given by the operation of the selection key 62, the CPU 11 causes the pop-up-displayed effecter edit screen 80 to vanish from the display 13. In an embodiment, as shown in FIG. 7, a plurality of control images (or icons) 81, 82, 83 representative of respective parameters for controlling various effect impartment processes in the effecter 50 are displayed on the effecter edit screen 80, so that the CPU 11 can receive a user's operation to any one of the control images 81, 82, 83 for adjusting a desired parameter for controlling a desired effect impartment process.

In a case of the ON/OFF key 63 being operated, the CPU 11 switches the effecter 50 between ON and OFF states. Specifically, when an instruction to switch the effecter 50 to the ON state is given by the operation of the ON/OFF key 63, at step S12, the CPU 11 sets the ON/OFF switch 46 of the "Return Channel" 40 (e.g., output channel 40*b* shown in FIG. 6) identified by the process into the ON state, whereas when an instruction to switch the effecter 50 to the OFF state is given by the operation of the ON/OFF key 63, the CPU 11 sets the ON/OFF switch 46 of the identified "Return Channel" into the OFF state. Alternatively, the CPU 11 may switch, in response to the operation of the ON/OFF key 63, a usage mode of the effecter 50 between the "Dry" and "Wet" (in other words, whether the effecter 50 is to be bypassed or not) by modifying the setting of the effecter input patch section 51 and effecter output patch section 52. In another embodiment, a dedicated ON/OFF switch (not shown) may be provided on the effecter 50 so that the CPU 11 can switch the dedicated ON/OFF switch between ON and OFF states in response to the operation of the ON/OFF key 63.

In a case of the cue key 65 being operated, the CPU 11 switches the monitor output (cue) from the effecter 50 between ON and OFF states. Specifically, when an instruction to switch the monitor output to the ON state is given by the operation of the cue key 65, the CPU 11 turns on a monitor ON/OFF switch (not shown) of the identified "Return Channel" 40, so that the audio signal from the identified "Return Channel" 40 is supplied to a monitor output bus (nor shown). On the other hand, when an instruction to switch the monitor output to the OFF state is given by the operation of the cue key 65, the CPU 11 turns off the monitor ON/OFF switch. Alternatively, a dedicated monitor ON/OFF switch (not shown) may be provided on the effecter 50 so that the CPU 11 can switch the dedicated monitor ON/OFF switch between ON and OFF states in response to the operation of the cue key 65.

As aforementioned, according to the mixer 10 of the present embodiment, the respective parameters related to the effecter 50 can be assigned to the respective manual controls 61-65 included in at least one channel strip 60 of the plurality of channel strips 60a, 60b, 60 c, . . . . Thus, because the channel strip having good operability becomes conveniently available for adjusting the parameters related to the effecter 50, operability in terms of adjustment of parameters related to the effecter 50 can be greatly improved. Further, because the plurality of manual controls 61-65 to be used for adjusting the parameters related to the effecter 50 are collectively provided on the single channel strip 60, the user can intuitively recognize which manual controls should be used to adjust the parameters related to the effecter 50. Moreover, because the channel strip 60 being existent in the mixer 10 is borrowed by the effecter 50 in order for adjusting the parameters related to the effecter 50, the operability in terms of adjustment of parameters related to the effecter 50 can be improved without increases in cost and the number of components.

Further, the user can grasp a flow of the audio signal being processed by the effecter 50 in corresponding relation to a vertical line of the manual controls 61-65 aligned on the channel strip 60 (particularly, a positional relation between the encoder 61 and the fader manual-operator 64). Namely, because particular parameters to be used in order of the flow of the audio signal being processed by the effecter 50 are assigned, in corresponding relation to the order of the signal processing, to particular manual controls disposed at suitable locations (e.g., the "upper" encoder 61 and the "lower" fader manual-operator 64) on the channel strip 60 where the manual controls 61-65 are aligned in the vertical line such that the user can clearly recognize the corresponding relation between the order of the signal processing and the locations of the manual controls 61-65, the user can intuitively operate or adjust necessary parameters (e.g., the send level and the return level) related to the effecter 50. Additionally, because both of the encoder 61 and the fader manual-operator 64 are suitable for controlling a sound volume, good operability in adjustment of the send level and the return level can be realized with this arrangement.

Further, according to the aforementioned embodiment, it is assumed that, when a particular channel strip 60 is employed for controlling the effecter 50 as aforementioned, the types of parameters assigned to the respective manual controls 61-65 of the particular channel strip 60 are similar or correspond to predetermined types of parameters assigned to the respective manual controls 61-65 in the conventional usage of the channel strip 60. Namely, the types of parameters assigned to the respective manual controls 61-65 when the particular channel strip 60 is employed for controlling the effecter 50 follow or imitate the predetermined types of parameters assigned to the respective manual controls 61-65 in the conventional usage of the channel strip 60. Such an arrangement is also advantageous to a special way of use that causes a given channel strip 60 to function as the "virtual effecter channel" because the user can easily grasp the types of parameters assigned to respective manual controls 61-65 of the given channel strip 60.

Further, according to the aforementioned embodiment, because the instruction to switch the effecter edit screen 80 for the effecter 50 to the display ON or OFF state is given by the selection key 62 of the channel strip 60, the user can more intuitively and easily access the effecter edit screen 80 for the effecter 50 compared with such a conventional construction that the user instructs a display ON or OFF state using a button image (or icon) displayed on a channel overview screen, for example. Furthermore, because the channel strips 60 are provided immediately below the display 13, the user can easily perform, at the same time, in parallel both of an operation to the effecter edit screen 80 displayed on the display 13 and an operation of the manual controls 61-65 of the channel strips 60.

Note that specific types of the parameters related to the effecter 50 to be assigned to the respective manual controls 61-65 of the channel strip 60 associated with the effecter 50 are not limited to the aforementioned example.

In another embodiment, the process performed at step S3 may be modified such that the CPU 11 assigns, to the selection key 62, a parameter for switching a Sends On Fader function for the effecter 50 between ON and OFF states instead of the aforementioned parameter for switching the effecter edit screen 80 between the display ON and OFF states, for example. Here, the Sends On Fader function for the effecter 50 is a function of assigning, to the respective fader manual-operators 64 included in the respective channel strips 60, respective send levels to the effecter 50 from the respective input channels 20 (e.g., input channels #1, #2, . . . # X shown in FIG. 6) which supply the respective audio signals to the effecter 50 (i.e., send levels to the bus 30a shown in FIG. 6 from the respective input channels 20). Specifically, the respective send levels to the effecter 50 from the respective input channels 20 (e.g., input channels #1, #2, . . . # X shown in FIG. 6) are values of respective bus send levels to a bus 30 (e.g., the bus 30a shown in FIG. 6) from the respective input channels 20 or values of the faders 25 in the respective input channels 20. In this embodiment, an instruction to switch the Sends On Fader function for the effecter 50 to the ON state in response to the operation of the selection key 62 (namely, a start instruction of the Sends On Fader function) is referred to as a "second instruction given by the user".

Figure 10:
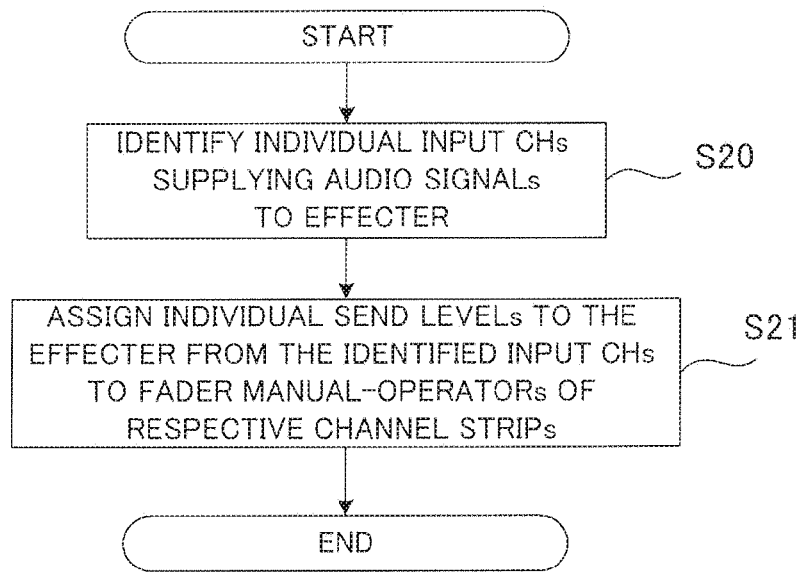
FIG. 10 is a flow chart of a process responsive to a start instruction of a Sends On Fader function for the effecter circuitry.

When the instruction to switch the Sends On Fader function for the effecter 50 to the ON state is given by the operation of the selection key 62, the CPU 11 begins a process associated with the Sends On Fader function for the effecter 50. FIG. 10 is a flow chart of a process executed by the CPU 11 when the instruction to switch the Sends On Fader function for the effecter 50 to the ON state is given by the operation of the selection key 62. At step S20, the CPU 11 identifies individual input channels 20 (e.g., input channels #1, #2, . . . # X shown in FIG. 6) from which individual audio signals are supplied to the effecter 50. Because a particular bus 30 (e.g., the bus 30a shown in FIG. 6) supplying a mixed audio signal to the effecter 50 can be specified on the basis of the setting content in the effecter input patch section 51, the CPU 11 can identify the individual input channels 20 supplying the individual audio signals to the effecter 50 on the basis of respective output ON/OFF states from the respective input channels 20a, 20b, 20c, . . . to the particular bus 30. Next, at step S21, the CPU 11 assigns, to the respective fader manual-operators 64 included in the respective channel strips 60, individual send levels to the effecter 50 from the identified individual input channels 20 (e.g., input channels #1, #2, . . . # X shown in FIG. 6) one by one. Namely, the assignment of the individual send level to the respective channel strips 60 is carried out on a one-by-one basis such that one send level from one input channel 20 to the effecter 50 is assigned to one channel strip 60, another send level from another input channel 20 to the effecter 50 is assigned to another channel strip 60, and so on. In an example, all channel strips 60 provided on the operation panel may be available for the Sends On Fader function for the effecter 50. In another example, other channel strips 60 than the channel strip 60 associated with the effecter 50 may be available for the Sends On Fader function for the effecter 50. For example, when a channel strip 60a is associated with the effecter 50, the CPU 11 may assign, to the respective fader manual-operators 64 included in the respective channel strips from the channel strip 60b of the right next to the channel strip 60a, the individual send levels to the effecter 50 from the identified individual input channels 20 (e.g., input channels #1, #2, . . . # X shown in FIG. 6). In such a case, keeping the parameters related to the effecter 50 assigned to a particular channel strip (e.g., 60a), the CPU 11 can execute a process for adjusting the respective send levels from the respective input channels 20 to the effecter 50 using the respective fader manual-operators 64 of the other channel strips (e.g., 60b, 60c, . . . ).

In another embodiment, the process performed at step S3 may be further modified such that the CPU 11 assigns different two or more parameters to the selection key 62; for example, both of the parameters (or functions) for switching the effecter edit screen 80 between the display ON and OFF states and for switching the Sends On Fader function for the effecter 50 between ON and OFF states may be assigned to the selection key 62 in parallel. In such a case, the CPU 11 may be configured to display the effecter edit screen 80 on the display 13 upon the first time of depression of the selection key 62, begin the process associated with the Sends On Fader function for the effecter 50 upon the second time of depression of the selection key 62, terminate the process associated with the Sends On Fader function for the effecter 50 upon the third time of depression of the selection key 62, and terminate to display the effecter edit screen 80 on the display 13 upon the fourth time of depression of the selection key 62, for example. With this arrangement, the user can quickly access various functions related to the effecter by depressing only the selection key 62 of the channel strip 60.

According to the aforementioned embodiment, by only beginning the process associated with the Sends On Fader function after the respective parameters related to the effecter 50 have been assigned to the respective manual controls 61-65 of the channel strip 60, the respective send levels to the effecter 50 from the respective input channels 20 (e.g., input channels #1, #2, . . . # X shown in FIG. 6) which supply the respective audio signals to the effecter 50 can be deployed to the fader manual-operators 64 of the plurality of channel strips 60. In this way, the user can intuitively and easily access the respective send levels to the effecter 50 from the respective input channels 20. Thus, operability in terms of adjustment of parameters related to the effecter 50 by the use of the channel strip 60 can be more improved.

Figure 11:
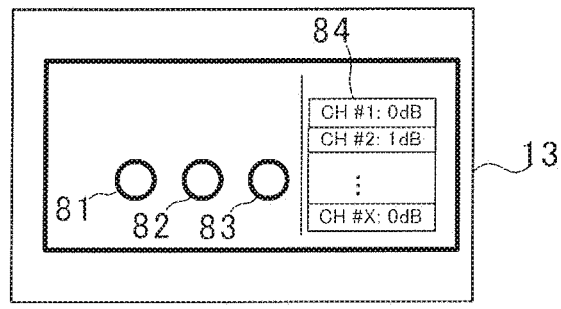
FIG. 11 is a diagram illustrating a modification of an edit screen in the effecter circuitry.

Further, the send levels to the effecter 50 from the respective input channels 20 (e.g., input channels #1, #2, . . . # X shown in FIG. 6) which supply the audio signals to the effecter 50 may be displayed on the display 13 in connection with the Sends On Fader function for the effecter 50. FIG. 11 shows an example of a list 84 indicative of the send levels to the effecter 50 from the respective input channels 20 that is displayed on a part of the effecter edit screen 80 presented on the display 13. As an example, the CPU 11 may control in interlock relation to the ON or OFF state of the Sends On Fader function whether the list 84 indicative of the send levels to the effecter 50 should be displayed or not.

Alternatively, the ON/OFF state of the Sends On Fader function for the effecter 50 may be designated by an operation of a button image (or icon) or the like displayed on the screen of the display 13 instead of the selection key 62.

In summary, the CPU 11 (namely, the controller 100) is configured to, in response to the second instruction given by the user (e.g., an operation of the selection key 62), assign, to one or more of the plurality of manual controls (e.g., fader manual-operator 64) included in one or more of the channel strips other than said at least one of the plurality of channel strips, respective parameters (e.g., send levels) for controlling respective sound volumes of the respective audio signals in the one or more of the plurality of channels from which the respective audio signals are supplied to the effecter 50 (namely, the auxiliary signal processor 150), so the Sends On Fader function, for example, can be realized.

Figure 12:
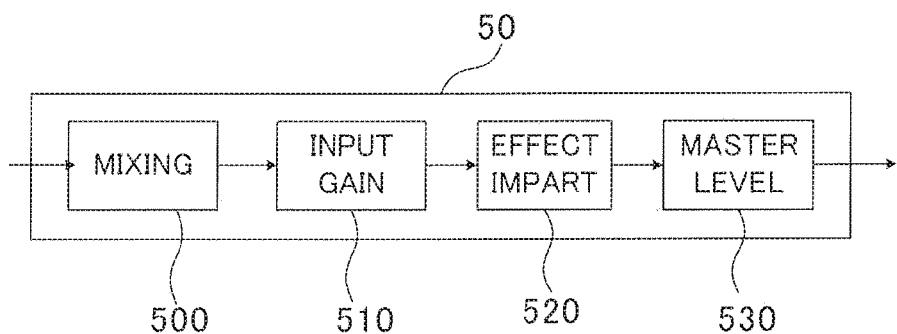
FIG. 12 is a block diagram illustrating a construction of the effecter circuitry according to another embodiment.

FIG. 12 is a block diagram illustrating a construction of the effecter 50 according to another embodiment. In the embodiment of FIG. 12, the effecter 50 includes a mixing section 500 that mixes a plurality of audio signals, an input gain control circuitry 510 that adjusts a level of an audio signal (i.e., the resultant-mixed audio signal of the mixing section 500) input thereto, an effect imparting section 520 that performs effect impartment processing on the level-adjusted audio signal, and a master level adjuster 530 that adjusts a sound volume of the effect-impartment-processed audio signal. In this case, because the effecter 50 includes the mixing section 500, the input gain control circuitry 510 and the master level adjuster 530, it is not necessary for the mixer 10 to provide with a mixing bus 30 (e.g., the bus 30a shown in FIG. 6) and the "Send Channel" (e.g., the output channel 40a shown in FIG. 6) to be used for mixing and sending the audio signals to the effecter 50 and the "Return Channel" (e.g., the output channel 40b shown in FIG. 6) to be used for returning the audio signal from the effecter 50. Namely, in this case, the effecter input patch section 51 can directly patch two or more input channels 20 (e.g., input channels #1, #2, . . . # X shown in FIG. 6) to the effecter 50 without using the mixing bus and "Send Channel", and the output patch section 52 can directly patch the output of the effecter 50 to a desired output destination (e.g., stereo output buses for a main output) without using the "Return Channel". In this case, the process performed at step S3 may be modified such that the CPU 11 assigns a parameter to be controlled by the input gain control circuitry 510 to the encoder 61 of the channel strip 60 and a parameter to be adjusted by the master level adjuster 530 to the fader manual-operator 64.

Whereas FIG. 6 shows an embodiment in which the output of the effecter 50 is patched to a single "Return Channel" 40b, the output of the effecter 50 may be patched to two or more "Return Channels" 40b, 40c, . . . . In such a case, for example, in addition to associating the effecter 50 with the desired channel strip 60 using the custom fader bank setting screen, the user may designate any one of the two or more "Return Channels" for the effecter 50 using the custom fader bank setting screen. Further, the user may designate any one of the two or more "Return Channels", using the effecter edit screen 80, as a single "Return Channel" to be patched to the effecter 50 associated with the desired channel strip 60 (namely, as a "Return Channel" to which the fader manual-operator 64 of the desired channel strip 60 is assigned). In other words, the "Return Channel" to which the fader manual-operator 64 of the desired channel strip 60 is assigned may be switched to another one using the effecter edit screen 80. In this case, in response to switching of the "Return Channel", the CPU 11 changes the assignment of parameters to the manual controls 61-65, as necessary. For example, the assignment of parameters to the fader manual-operator 64, the ON/OFF key 63 and the cue key 65 may be changed.

Whereas, in the aforementioned embodiment, the choices of the subject regarding the effecter 50 presented by the custom fader bank setting screen include only an effecter function or functions currently employed for the signal processing in the effecter 50, all of the internal effecter functions provided in the mixer 10 may be presented by the custom fader bank setting screen in another embodiment. Further, in an embodiment, input/output setting of the effecter 50 associated with the channel strip 60 (namely, the setting of the effecter input patch section 51 and the effecter output patch section 52) may be carried out using the custom fader bank setting screen.

Whereas the aforementioned embodiment has been described about the case where the effecter 50 is used or operated in the "Send & Return" mode, the present invention can be applied to any usage of the effecter 50 such as an insertion mode of the effecter 50 in which the effecter 50 is inserted at an insertion position selected by the switching section 28 or 48 (see FIG. 4 or 5) of a single channel, for example.

Whereas the auxiliary signal processor 150 in the aforementioned embodiment is the internal effecter 50 incorporated in the mixer 10, the auxiliary signal processor 150 is not limited to the effecter 50. Another example of the auxiliary signal processor 150 may be an internal recorder that is incorporated in the mixer 10, so that the present invention can be applied to a recording function (or a recorder mode) and/or a reproduction function (or a playback mode) that can be carried out by the internal recorder. In such an embodiment, the controller 100 may be configured to assign, in response to the assignment instruction (namely, the first instruction) given by the user, a parameter related to the recording or reproduction function of the internal recorder (i.e., the auxiliary signal processor 150) to at least one of the plurality of manual controls 61-65 included in at least one of the plurality of channel strips 60. In a case where parameters related to the recording function (or the recorder mode) are assigned to a particular channel strip 60, the process performed at said step S3 may be modified such that the CPU 11 respectively assigns a parameter for switching a recorder operation screen between display ON and OFF states to the selection key 62 of the particular channel strip 60, a parameter for adjusting an input level of the internal recorder (i.e., the auxiliary signal processor 150) to the fader manual-operator 64 of the particular channel strip 60, and a parameter for switching a function of test-listening of au input audio signal (namely, an input monitor mode) between ON and OFF states to the cue key 63 of the particular channel strip 60, for example. In this way, the parameters related to the recording function corresponding to a series of tasks, such as a startup of the recorder operation screen, adjustment of the input level of the recorder, test-listening of the input audio signal to be recorded in the recorder, etc., can be assigned to the manual controls belonging to the single channel strip 60.

On the other hand, In a case where parameters related to the reproduction function (or the playback mode) are assigned to a particular channel strip 60, the process performed at said step S3 may be modified such that the CPU 11 respectively assigns a parameter for switching a recorder operation screen between display ON and OFF states to the selection key 62 of the particular channel strip 60, a parameter for adjusting an output level of the internal recorder (i.e., the auxiliary signal processor 150) to the fader manual-operator 64 of the particular channel strip 60, and a parameter for switching a function of test-listening of au output audio signal (namely, an output monitor mode) between ON and OFF states to the cue key 63 of the particular channel strip 60, for example. In this way, the parameters related to the reproduction function corresponding to a series of tasks, such as the startup of the recorder operation screen, adjustment of the output level of the recorder, test-listening of the output audio signal output reproduced by the recorder, etc., can be assigned to the manual controls belonging to the single channel strip 60.

In this way, because functions of adjusting the parameters related to the auxiliary signal processor 150 rather than signal processing parameters for a channel are assigned to at least one of the plurality of channel strips 60, the present invention achieves that the at least one channel strip is conveniently used for adjusting the parameters related to the auxiliary signal processor 150.

In another embodiment, the process performed at said step S3 may be modified such that the CPU 11 assigns a parameter related to the auxiliary signal processor 150 to at least one of the manual controls 61-65 of the channel strip 60. Further, in an embodiment, at least one channel strip among the plurality of channel strips 60 is fixedly used as a dedicated channel strip for adjustment of the parameters related to the auxiliary signal processor 150 (namely, the effecter 50, etc.).

Whereas various embodiments of the present invention have been described above in detail, it should be appreciated that the present invention is not necessarily limited to the above-described embodiments and may be modified variously within the scope of the technical ideal disclosed in the claims, description and drawings.

For example, the audio signal processing apparatus 1 of the present invention is also applicable to a recorder, amplifier, processor, etc. other than the mixer 10. Further, the audio signal processing apparatus 1 of the present invention may comprise a dedicated hardware apparatus (integrated circuitry etc.) constructed to perform the functions of the components 20, 60, 100 and 150 shown in FIG. 1. Alternatively, the audio signal processing apparatus 1 may comprise a processor apparatus having functions to execute a program for performing the functions of the components 20, 60, 100 and 150 shown in FIG. 1.

Furthermore, the present invention is applicable to a DAW (Digital Audio Workstation) software application, such as Cubase (registered trademark) or ProTools (registered trademark), or a video editing software application.

The present invention may be constructed and implemented as a computer-implemented method for assigning parameters to the manual controls in the audio signal processing apparatus 1 shown in FIG. 1, wherein the method comprises the steps as aforementioned in this specification in detail with reference to the accompanying drawings. Also, the present invention may be implemented as a non-transitory computer-readable storage medium storing a program executable by one or more processors or a computer for performing the method.

This application is based on, and claims priority to, Japanese Patent Application No. 2017-141062 filed on 20 Jul. 2017. The disclosure of the priority application, in its entirety, including the drawings, claims, and the specification thereof, are incorporated herein by reference.

What is claimed is:

1. An audio signal processing apparatus comprising:
a plurality of channels each configured to perform given signal processing on an input audio signal;
an auxiliary signal processor configured to input an audio signal from one or more of the plurality of channels and perform auxiliary signal processing different from the given signal processing on the audio signal input to the auxiliary signal processor;
a plurality of channel strips each associated with one of the plurality of channels and including a plurality of manual controls for adjusting parameters for the given signal processing of the one channel associated with the channel strip; and
a controller that, in response to an assignment instruction given by a user, associates at least one of the plurality of channel strips with the auxiliary signal processor, and assigns, in place of the parameters for the given signal processing, parameters related to the auxiliary signal processor to the plurality of manual controls included in the associated at least one channel strip,
wherein when no assignment instruction has been given by the user, the plurality of channel strips each function to adjust the parameters for the given signal processing of the one channel associated with the channel strip, on the other hand, when the assignment instruction has been given by the user, the associated at least one channel strip functions to adjust the assigned parameters related to the auxiliary signal processor, while each of the other channel strips than the associated at least one channel strip maintains the function of adjusting the parameters for the given signal processing of the one channel associated with the channel strip,
wherein the plurality of manual controls included in each of the plurality of channel strips are aligned in an aligned order in a vertical direction,
wherein the parameters for the given signal processing of the one channel associated with the channel strip are respectively assigned to the plurality of manual controls included in the channel strip in such a manner that the aligned order of the plurality of manual controls in the vertical direction corresponds to a sequence of signal processing in the one channel associated with the channel strip, and
wherein the parameters related to the auxiliary signal processor are respectively assigned to the plurality of manual controls included in the associated at least one channel strip in such a manner that the aligned order of the plurality of manual controls in the vertical direction corresponds to a sequence of signal processing in the auxiliary signal processor.

2. The audio signal processing apparatus as claimed in claim 1, wherein, in response to the assignment instruction given by the user, the controller assigns, to at least one of the plurality of manual controls included in the associated at least one channel strip, a parameter for controlling a sound volume of an audio signal input to the auxiliary signal processor and assigns, to at least another one of the plurality of manual controls included in the associated at least one channel strip, a parameter for controlling a sound volume of an audio signal output from the auxiliary signal processor.

3. The audio signal processing apparatus as claimed in claim 2, which further comprises a bus that receives one or more audio signals, from one or more of the plurality of channels, to be input to the auxiliary signal processor, mixes the received one or more audio signals and outputs a resultant mixed audio signal to the auxiliary signal processor,
wherein at least first one of the plurality of channels functions as a send channel that controls a sound volume of the resultant mixed audio signal output from the bus and sends the resultant volume-controlled audio signal to the auxiliary signal processor, and at least second one of the plurality of channels functions as a return channel that controls a sound volume of an audio signal output from the auxiliary signal processor, and
wherein, in response to the assignment instruction given by the user, the controller assigns, to said at least one of the plurality of manual controls included in the associated at least one channel strip, a parameter for controlling the sound volume of the audio signal in the send channel and assigns, to said at least another one of the plurality of manual controls included in the associated at least one channel strip, a parameter for controlling the sound volume of the audio signal in the return channel.

4. The audio signal processing apparatus as claimed in claim 2, wherein the auxiliary signal processor includes an input gain control circuitry for controlling a sound volume of an audio signal input to the auxiliary signal processor and a master level adjuster for controlling a sound volume of an audio signal output from the auxiliary signal processor, and
wherein, in response to the assignment instruction given by the user, the controller assigns a parameter for the input gain control circuitry to said at least one of the plurality of manual controls included in the associated at least one channel strip and assigns a parameter for the master level adjuster to said at least another one of the plurality of manual controls included in the associated at least one channel strip.

5. The audio signal processing apparatus as claimed in claim 1, wherein, in response to a second instruction given by the user, the controller further assigns, to one or more of the plurality of manual controls included in one or more of the channel strips other than the associated at least one channel strip, respective parameters for controlling respective sound volumes of the respective audio signals in the one or more of the plurality of channels from which the respective audio signals are supplied to the auxiliary signal processor.

6. The audio signal processing apparatus as claimed in claim 5, wherein, in response to a user's instruction, the controller further assigns a function of issuing the second instruction to one of the plurality of manual controls included in the associated at least one channel strip.

7. The audio signal processing apparatus as claimed in claim 1, wherein the auxiliary signal processing performed by the auxiliary signal processor is an effect impartment process for imparting an audio effect to the input audio signal.

8. The audio signal processing apparatus as claimed in claim 1, wherein, in response to the assignment instruction given by the user, the controller assigns at least one parameter related to the auxiliary signal processor to at least one of the plurality of manual controls included in the associated at least one channel strip in place of at least one of the signal processing parameters of at least one channel associated with the associated at least one channel strip.

9. An audio signal processing apparatus comprising:
a plurality of channels each configured to perform given signal processing on an input audio signal;
an auxiliary signal processor configured to input an audio signal from one or more of the plurality of channels and perform auxiliary signal processing different from the given signal processing on the audio signal input to the auxiliary signal processor;
a plurality of channel strips each associated with one of the plurality of channels and including a plurality of manual controls which includes an encoder that adjusts a panning or gain of an audio signal of the one channel associated with the channel strip and a fader manual-operator that adjusts a sound volume of the audio signal of the one channel associated with the channel strip; and
a controller that, in response to an assignment instruction given by a user, associates at least one of the plurality of channel strips with the auxiliary signal processor, assigns, in place of the panning or gain of the audio signal, a parameter for controlling a sound volume of an audio signal input to the auxiliary signal processor to the encoder included in the associated at least one channel strip and assigns, in place of the sound volume of the audio signal, a parameter for controlling a sound volume of an audio signal output from the auxiliary signal processor to the fader manual-operator included in the associated at least one channel strip,
wherein when no assignment instruction has been given by the user, the plurality of channel strips each function to adjust, via the encoder and fader manual-operator, the panning or gain and sound volume of the audio signal of the one channel associated with the channel strip, on the other hand, when the assignment instruction has been given by the user, the associated at least one channel strip functions to adjust, via the encoder and fader manual-operator, parameters for controlling input and output sound volumes of the auxiliary signal processor, while the encoder and fader manual-operator of each of the channel strips other than the associated at least one channel strip maintains the function of adjusting the panning or gain and sound volume of the audio signal of the one channel associated with the channel strip,
wherein the plurality of manual controls included in each of the plurality of channel strips are aligned in an aligned order in a vertical direction,
wherein parameters for controlling the audio signal of the one channel associated with the channel strip are respectively assigned to the plurality of manual controls included in the channel strip in such a manner that the aligned order of the plurality of manual controls in the vertical direction corresponds to a sequence of signal processing in the one channel associated with the channel strip, and
wherein parameters related to the auxiliary signal processor are respectively assigned to the plurality of manual controls included in the associated at least one channel strip in such a manner that the aligned order of the plurality of manual controls in the vertical direction corresponds to a sequence of signal processing in the auxiliary signal processor.

10. A method for assigning parameters to manual controls in an audio signal processing apparatus, the audio signal processing apparatus including: a plurality of channels each configured to perform given signal processing on an input audio signal; an auxiliary signal processor configured to input an audio signal from one or more of the plurality of channels and perform auxiliary signal processing different from the given signal processing on the audio signal input to the auxiliary signal processor; and a plurality of channel strips each associated with one of the plurality of channels and including a plurality of manual controls for adjusting parameters for the given signal processing of the one channel associated with the channel strip, the method comprising:
an assignment step of, in response to an assignment instruction given by a user, associating at least one of the plurality of channel strips with the auxiliary signal processor, and assigning, in place of the parameters for the given signal processing, parameters related to the auxiliary signal processor to the plurality of manual controls included in the associated at least one channel strip,
wherein when no assignment instruction has been given by the user, the plurality of channel strips each function to adjust the parameters for the given signal processing of the one channel associated with the channel strip, on the other hand, when the assignment instruction has been given by the user, the associated at least one channel strip functions to adjust the assigned parameters related to the auxiliary signal processor, while each of the channel strips other than the associated at least one channel strip maintains the function of adjusting the parameters for the given signal processing of the one channel associated with the channel strip,
wherein the plurality of manual controls included in each of the plurality of channel strips are aligned in an aligned order in a vertical direction,
wherein the parameters for the given signal processing of the one channel associated with the channel strip are respectively assigned to the plurality of manual controls included in the channel strip in such a manner that the aligned order of the plurality of manual controls in the vertical direction corresponds to a sequence of signal processing in the one channel associated with the channel strip, and
wherein the parameters related to the auxiliary signal processor are respectively assigned to the plurality of manual controls included in the associated at least one channel strip in such a manner that the aligned order of the plurality of manual controls in the vertical direction corresponds to a sequence of signal processing in the auxiliary signal processor.

11. The method as claimed in claim 10, wherein, in response to the assignment instruction given by the user, the assignment step assigns, to at least one of the plurality of manual controls included in the associated at least one channel strip, a parameter for controlling a sound volume of an audio signal input to the auxiliary signal processor and assigns, to at least another one of the plurality of manual controls included in the associated at least one channel strip, a parameter for controlling a sound volume of an audio signal output from the auxiliary signal processor.

12. The method as claimed in claim 11, wherein the audio signal processing apparatus further includes a bus that receives one or more audio signals, from one or more of the plurality of channels, to be input to the auxiliary signal processor, mixes the received one or more audio signals and outputs a resultant mixed audio signal to the auxiliary signal processor, wherein at least first one of the plurality of channels included in the audio signal processing apparatus functions as a send channel that controls a sound volume of the resultant mixed audio signal output from the bus and sends the resultant volume-controlled audio signal to the auxiliary signal processor, and at least second one of the plurality of channels included in the audio signal processing apparatus functions as a return channel that controls a sound volume of an audio signal output from the auxiliary signal processor, and wherein, in response to the assignment instruction given by the user, the assignment step assigns, to said at least one of the plurality of manual controls included in the associated at least one channel strip, a parameter for controlling the sound volume of the audio signal in the send channel and assigns, to said at least another one of the plurality of manual controls included in the associated at least one channel strip, a parameter for controlling the sound volume of the audio signal in the return channel.

13. The method as claimed in claim 11, wherein the auxiliary signal processor includes an input gain control circuitry for controlling a sound volume of an audio signal input to the auxiliary signal processor and a master level adjuster for controlling a sound volume of an audio signal output from the auxiliary signal processor, and wherein, in response to the assignment instruction given by the user, the assignment step assigns a parameter for the input gain control circuitry to said at least one of the plurality of manual controls included in the associated at least one channel strip and assigns a parameter for the master level adjuster to said at least another one of the plurality of manual controls included in the associated at least one channel strip.

14. The method as claimed in claim 10, wherein, in response to a second instruction given by the user, the assignment step further assigns, to one or more of the plurality of manual controls included in one or more of the channel strips other than the associated at least one channel strip, respective parameters for controlling respective sound volumes of the respective audio signals in the one or more of the plurality of channels from which the respective audio signals are supplied to the auxiliary signal processor.

15. The method as claimed in claim 14, wherein, in response to a user's instruction, the assignment step further assigns a function of issuing the second instruction to one of the plurality of manual controls included in the associated at least one channel strip.

16. The method as claimed in claim 10, wherein the auxiliary signal processing performed by the auxiliary signal processor is an effect impartment process for imparting an audio effect to the input audio signal.

17. The method as claimed in claim 10, wherein, in response to the assignment instruction given by the user, the assignment step assigns at least one parameter related to the auxiliary signal processor to at least one of the plurality of manual controls included in the associated at least one channel strip in place of at least one of the signal processing parameters of at least one channel associated with the associated at least one channel strip.

18. The method as claimed in claim 10, wherein the plurality of manual controls included in the at least one of the plurality of channel strips includes an encoder that adjusts a panning or gain of an audio signal of the one channel associated with the channel strip and a fader manual-operator that adjusts a sound volume of the audio signal of the one channel associated with the channel strip, and wherein, in response to the assignment instruction given by the user, the assignment step assigns a parameter for controlling a sound volume of the audio signal input to the auxiliary signal processor to the encoder and assigns a parameter for controlling a sound volume of an audio signal output from the auxiliary signal processor to the fader manual-operator.

19. A non-transitory machine-readable storage medium containing a program executable by a processor to perform a method for assigning parameters to manual controls in an audio signal processing apparatus, the audio signal processing apparatus including: a plurality of channels each configured to perform given signal processing on an input audio signal; an auxiliary signal processor configured to input an audio signal from one or more of the plurality of channels and perform auxiliary signal processing different from the given signal processing on the audio signal input to the auxiliary signal processor; and a plurality of channel strips each associated with one of the plurality of channels and including a plurality of manual controls for adjusting parameters for the given signal processing of the one channel associated with the channel strip, the method comprising:

an assignment step of, in response to an assignment instruction given by a user, associating at least one of the plurality of channel strips with the auxiliary signal processor, and assigning, in place of the parameters for the given signal processing, parameters related to the auxiliary signal processor to the plurality of manual controls included in the associated at least one channel strip, wherein when no assignment instruction has been given by the user, the plurality of channel strips each function to adjust the parameters for the given signal processing of the one channel associated with the channel strip, on the other hand, when the assignment instruction has been given by the user, the associated at least one channel strip functions to adjust the assigned parameters related to the auxiliary signal processor, while each of the channel strips other than the associated at least one channel strip maintains the function of adjusting the parameters for the given signal processing of the one channel associated with the channel strip, wherein the plurality of manual controls included in each of the plurality of channel strips are aligned in an aligned order in a vertical direction, wherein the parameters for the given signal processing of the one channel associated with the channel strip are respectively assigned to the plurality of manual controls included in the channel strip in such a manner that the aligned order of the plurality of manual controls in the vertical direction corresponds to a sequence of signal processing in the one channel associated with the channel strip, and wherein the parameters related to the auxiliary signal processor are respectively assigned to the plurality of manual controls included in the associated at least one channel strip in such a manner that the aligned order of the plurality of manual controls in the vertical direction corresponds to a sequence of signal processing in the auxiliary signal processor.

20. The non-transitory machine-readable storage medium as claimed in claim 19, wherein the plurality of manual controls included in the at least one of the plurality of channel strips includes an encoder that adjusts a panning or gain of an audio signal of the one channel associated with the channel strip and a fader manual-operator that adjusts a sound volume of the audio signal of the one channel associated with the channel strip, and wherein, in response to the assignment instruction given by the user, the assignment step assigns a parameter for controlling a sound volume of the audio signal input to the auxiliary signal processor to the encoder and assigns a parameter for controlling a sound volume of an audio signal output from the auxiliary signal processor to the fader manual-operator.

\* \* \* \* \*